United States Patent
Gardell et al.

[19]

[11] Patent Number: 5,809,828

[45] Date of Patent: Sep. 22, 1998

[54] CLOTHES DRYER EXHAUST TEST DRIVE

[75] Inventors: Dale Wayne Gardell, St. Joseph; Doral Eugene Jackson, Kalamazoo; George Angelov, St. Joseph; William A. Jackson, Hartford, all of Mich.; Daniel W. Southworth, South Bend, Ind.; Michael A. Dirlam; Steven J. Mejeur, both of St. Joseph, Mich.

[73] Assignee: Whirlpool Corporation, Benton Harbor, Mich.

[21] Appl. No.: 953,163

[22] Filed: Oct. 17, 1997

[51] Int. Cl.$^6$ ....................................... G01N 19/00
[52] U.S. Cl. ........................... 73/865.9; 116/215
[58] Field of Search ................. 73/168, 861.71, 73/865.9; 116/215, 273, 275; 340/606–611

[56] References Cited

U.S. PATENT DOCUMENTS

| | | | |
|---|---|---|---|
| 2,034,373 | 3/1936 | Bilde | 116/114 |
| 3,287,973 | 11/1966 | Liebermann et al. | 73/228 |
| 4,081,997 | 4/1978 | Losert | 73/168 |
| 4,203,383 | 5/1980 | Hill | 116/215 |
| 4,409,844 | 10/1983 | Schweiso | 73/861 |
| 4,747,364 | 5/1988 | Horowitz | 116/268 |
| 5,042,170 | 8/1991 | Hauch et al. | 34/82 |
| 5,195,376 | 3/1993 | Banks et al. | 73/744 |
| 5,315,838 | 5/1994 | Thompson | 62/129 |

*Primary Examiner*—Richard Chilcot
*Assistant Examiner*—Jewel Thompson
*Attorney, Agent, or Firm*—Robert O. Rice; Stephen D. Krefman; Thomas J. Roth

[57] ABSTRACT

An airflow test device designed to be used in a clothes dryer. The device includes a retainer which is mounted to an outlet grate of the dryer drum. A vent card is removably supported a predetermined distance from the outlet grate by a support finger extending from the retainer. The vent card is supported in such a manner that a predetermined rate of airflow through the outlet grate during dryer operation moves the vent card toward the outlet grate. Movement of the vent card toward the outlet grate and off the support finger during clothes dryer operation signals that an adequate rate of airflow is passing through the outlet grate.

17 Claims, 2 Drawing Sheets

CLOTHES DRYER EXHAUST TEST DRIVE

BACKGROUND OF THE INVENTION

1. Field of the Invention

This invention relates generally to automatic clothes dryers and more particularly to a device and method for testing the rate of airflow through a dryer's exhaust ducting.

2. Description of Related Art

Most automatic clothes dryers utilize a drum rotatable about a substantially horizontal axis in which clothes to be dried are place. During operation of the clothes dryer, air is heated and drawn through the drum by a blower while the drum is being rotated to tumble the clothes and effect drying thereof. After passing though the drum, the heated air passes through a filter arrangement and is then expelled through an exhaust outlet outside the machine. Typically, a flexible exhaust duct is connected to the exhaust outlet to direct the exhausted air through a wall to the outdoor atmosphere.

A common problem which occurs during the installation of a dryer is that the venting path of the dryer is obstructed or impeded by misinstalling the flexible exhaust duct. For example, if the flexible exhaust duct is to long or is crimped, the airflow through the exhaust duct may be impeded resulting in a reduced airflow through the dryer. If the airflow through the dryer is reduced to the extent that the flow rate cannot carry the water out of the dryer as fast as the heat source is capable of evaporating the water, then the drying process will be slowed and the drum temperature elevated to a point that the drying efficiency will be reduced.

Because of the detrimental effects of insufficient airflow through the drum and the inconvenience of a service call to correct the exhaust duct connection, it is highly desirable to have a means of measuring the airflow rate while the drum is rotating after the dryer is initially installed to verify that the airflow rate is adequate for proper dryer operation. By measuring air flow through the drum, it may be determined whether or not the exhaust duct is sufficient to handle the correct rate of airflow.

Past efforts to provide a device to measure dryer airflow rates have resulted in relatively expensive and complicated instruments. For example, U.S. Pat. No. 4,081,997, to Losert, discloses an air flow test apparatus for a clothes dryer comprising a fan and counter which removably attaches to the rear wall of the dryer adjacent air flow perforations. The fan rotates in response to airflow passing into the dryer drum and the counter registers the number of revolutions made by the fan for a period of time. By comparing the measured fan revolutions to a number previously determined, the adequacy of the airflow in the dryer can be determined.

As can be readily appreciated, the '997 device is relatively complex and costly. Since many dryers are installed by consumers, there is a need for a dryer airflow test device that is simple to use, reliable and relatively inexpensive. Accordingly, it is desirable and would be an improvement in the art to provide an airflow test device which is sufficiently inexpensive and easy to use such that it could be readily employed by an untrained consumer.

SUMMARY OF THE INVENTION

The present invention provides an airflow device for checking the adequacy of the rate of airflow in a clothes dryer which is simple to use and inexpensive. Specifically, the present invention provides a disposable airflow device which can be provided with each dryer such that the rate of airflow through the dryer can be checked after installation.

The airflow device is designed to be used in a clothes dryer having a drum for receiving clothes, a blower for moving air through the drum and an outlet grate through which air is exhausted from the drum. The device includes a retainer having means for engaging the outlet grate. A vent card having a planar surface is removably supported a predetermined distance from the outlet grate such that the vent card is moved toward the outlet grate by a predetermined rate of airflow through the outlet grate during dryer operation. Movement of the vent card toward the outlet grate during clothes dryer operation signals that an adequate rate of airflow is passing through the outlet grate.

More particularly, the retainer includes mounting arms which engage apertures on the outlet grate such that the retainer extends perpendicularly from the outlet grate. The retainer also has a support finger forming a hook-like structure upon which the vent card can be mounted by extending the support finger through an aperture provided in the vent plate. Movement of the vent card toward the outlet grate during dryer operation, draws the vent card off the support finger.

DESCRIPTION OF THE PREFERRED EMBODIMENT

Figure 1:
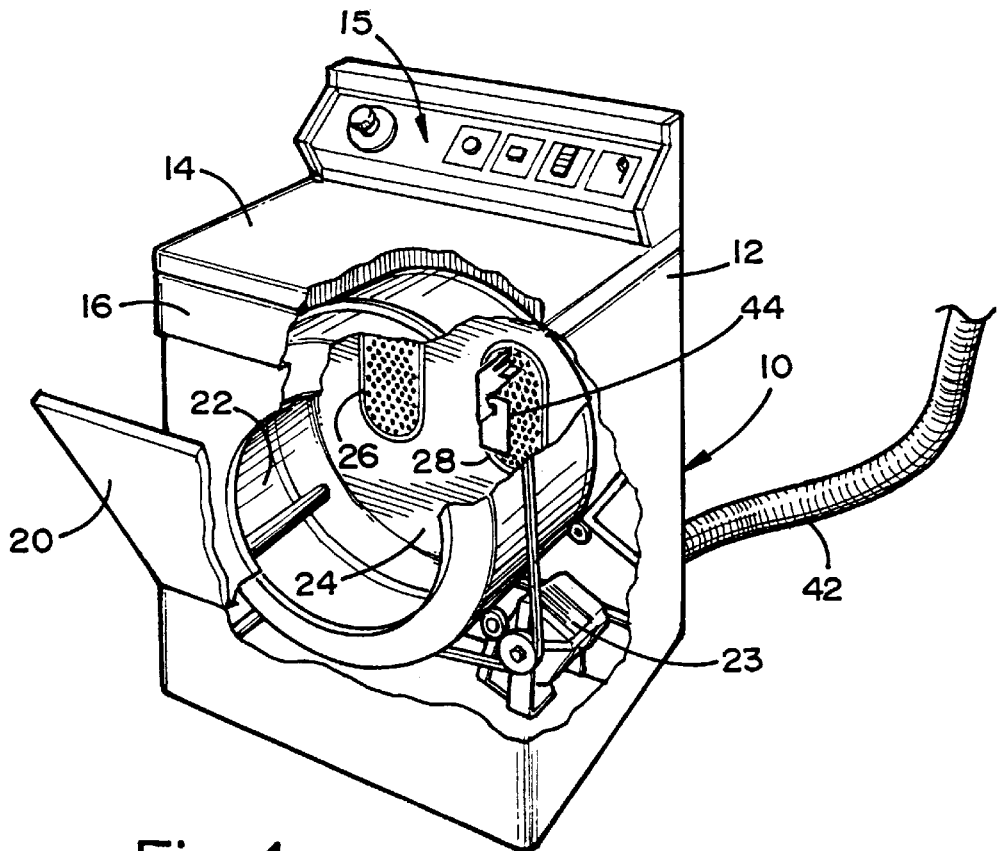
FIG. 1 is a front perspective view of a dryer partially cut away to show a airflow test device embodying the present invention.

In FIG. 1 there is illustrated a clothes dryer generally at 10 having a cabinet 12 with a front wall 16 and a top wall 14. At a rear of the top wall 14 there is a control panel 16 having a plurality of controls which may be manually actuatable by a user to cause the dryer to proceed through a sequence of drying steps. Hingedly connected to the front wall 16 is an openable door 20 providing access to the interior of a horizontal axis dryer drum 22. A motor 23 is operated to rotate the drum 22 about its horizontal axis. The dryer further includes a stationary rear bulkhead 24 which sealingly interconnects with the rear edge of the drum 22.

During operation, air is heated by a heater (not shown) and directed into the interior of the drum 22 through an inlet grate 26 such that heated air is supplied into the drum to dry the clothes. The air is then exhausted from the interior of the drum through an outlet grate 28. After passing through the outlet grate, air is drawn through a rear duct into a blower (not shown). The blower then forces the air out of the dryer 10 into a flexible exhaust duct 42. An air filter arrangement may be provided between the outlet grate 28 and the exhaust duct 42. As described above, any misinstallation of the exhaust duct 42 can lead to inadequate airflow through the dryer. An air flow measuring device 44 provided adjacent the outlet grate 28 operates to measure airflow through the dryer drum 22 and embodies the principles of the present invention.

Figure 2:
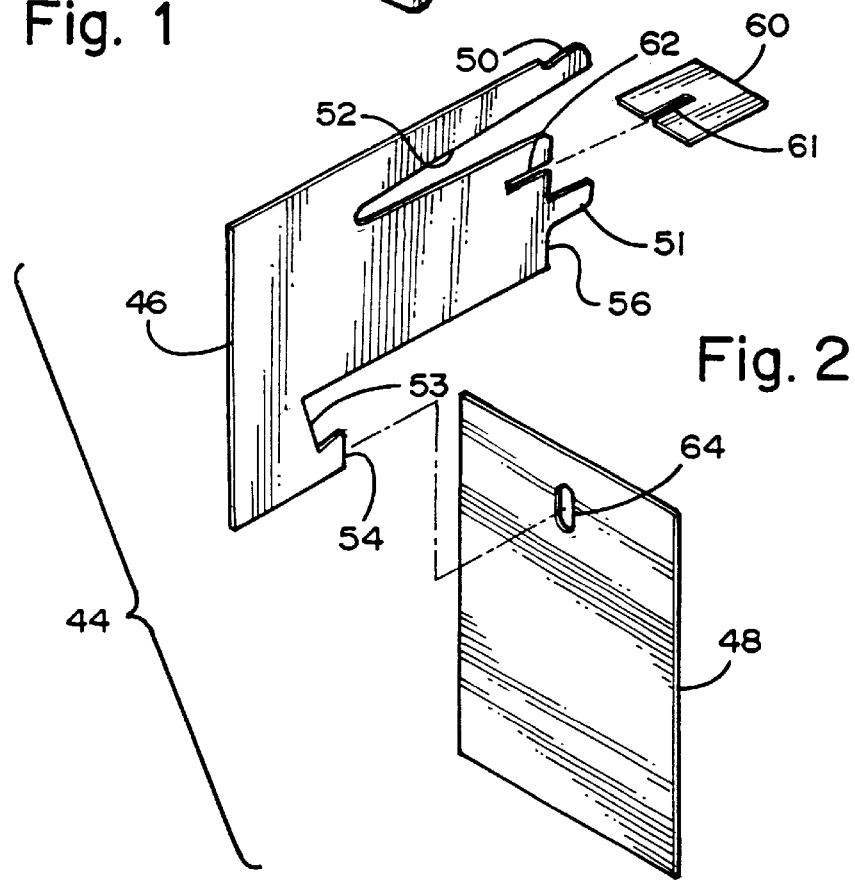
FIG. 2 is an exploded, perspective view of the airflow test device of FIG. 1.
Figure 3:
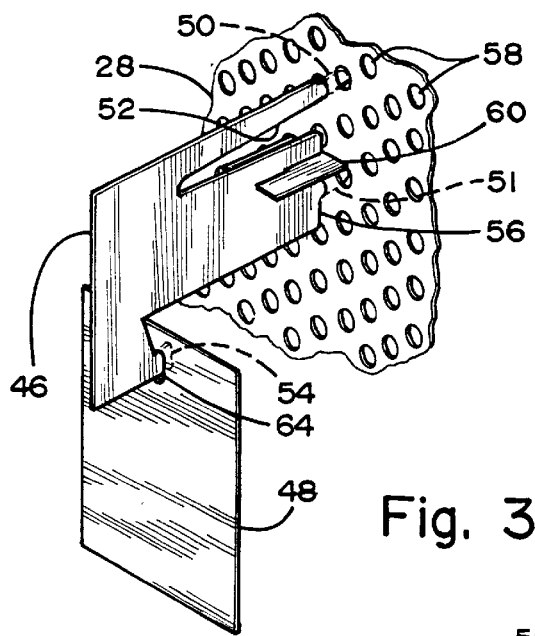
FIG. 3 is a perspective view of the airflow test device of FIG. 1 mounted to the dryer outlet grate.

As shown in FIGS. 2–3, the air flow measuring device includes a retainer 46 and a vent card 48 which are both flat, planar parts and may be readily fabricated out of cardboard sheet. The retainer 46 includes a pair of mounting arms 50 and 51 separated by an elongated notch 52 and a support finger 54 extending from a cut away edge 53. The mounting arms 50, 51 extend from a back edge 56 and are readily inserted into a pair of corresponding apertures 58 provided on the outlet grate 28 such that the retainer 46 may be removably connected to the outlet grate 28.

When the retainer 46 is properly mounted, the rear edge 56 is pressed adjacent the outlet grate 28 and the retainer 46 extends perpendicularly out from the outlet grate 28 such that the cut away edge 53 is disposed a predetermined distance away from the surface of the grate 28. A cross-piece member 60 may optionally be provided to ensure that the retainer 46 extends perpendicularly from the grate 28. The cross-piece 60 is assembled to the retainer 46 by aligning corresponding slots 61, 62 on the cross-piece 60 and retainer 46, respectively, and press fitting the retainer 48 and cross-piece 60 together.

The vent card 48 is configured to be removably supported by the retainer 46 by extending the support finger 54 through an aperture 64 provided in the vent card 48. The support finger 54 includes an upwardly angled top edge 54 such that the support finger 54 forms a hook-type member for securely supporting the vent card 48. When the vent card 48 is mounted onto the support finger 54, the upper portion of the vent card 48 contacts the cut away edge 53. Accordingly, the vent card 48 is supported substantially parallel to the outlet grate 28 a predetermined distance away from the outlet grate 28.

The airflow measuring device 44 is designed such that the vent card 48 having a predetermined size and weight may be supported a predetermined distance from the outlet grate 28. During dryer operation, when the vent card 48 is supported by the retainer, if the rate of airflow drawn through the outlet grate 28 is adequate, the vent card will be pulled or sucked off the support finger 54 and drawn into the outlet grate 28. If an insufficient rate of air is moving through the dryer, then the vent card 48 will not be drawn off the support finger 54.

Accordingly, to use the air flow measuring device 44, the consumer mounts the retainer 46 to the outlet grate 28 and hangs the vent card 48 from the support finger 54. The consumer then energizes the dryer for a test period of time, such as 15 seconds. At the conclusion of the test period, the consumer opens the dryer door 20 to observe the status of the vent card 48. If an adequate rate of airflow through the dryer occurred, the vent card will have been pulled off the support finger 54 and will be found by the consumer at the bottom of the drum when the consumer opens the dryer door 20. An inadequate rate of air flow will be signaled by the vent card remaining on the support finger 54 indicating to the consumer to check the exhaust duct system to ensure proper dryer venting.

Figure 4:
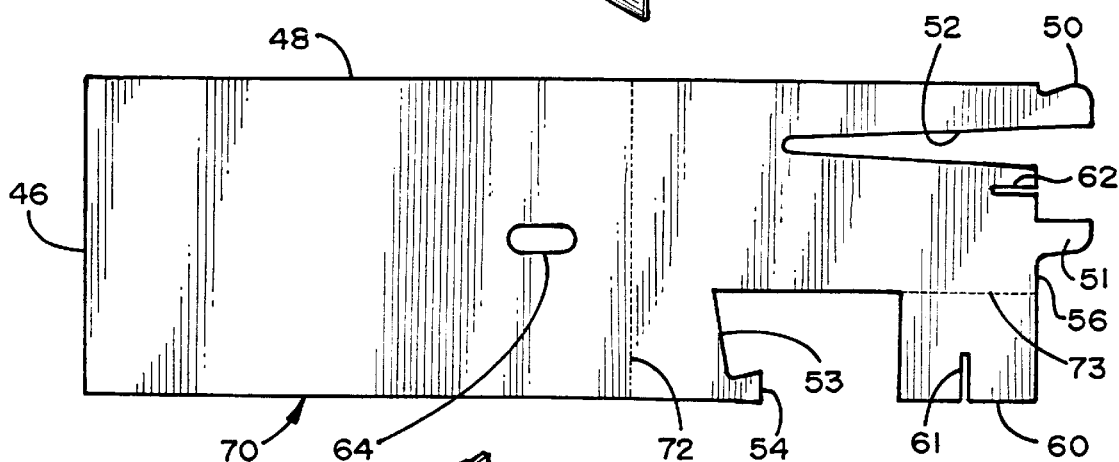
FIG. 4 is a plan view of the airflow test device of FIG. 1 prior to assembly.

FIG. 4 illustrates how the airflow test device may preferably be fabricated out of a single sheet of card board 70 which is frangible along a perforated lines 72 and 73. As illustrated, the retainer 46, the vent card 48 and the cross-piece 60 may be die cut out of the sheet of cardboard 70 with the perforated lines 72, 73 separating the retainer 46 from the vent card 48 and the retainer from the cross-piece 60, respectively. The cardboard sheet 50 can then be shipped to the consumer and subsequently separated into three pieces by the consumer prior to mounting the device 44 to the outlet grate 28.

Figure 5:
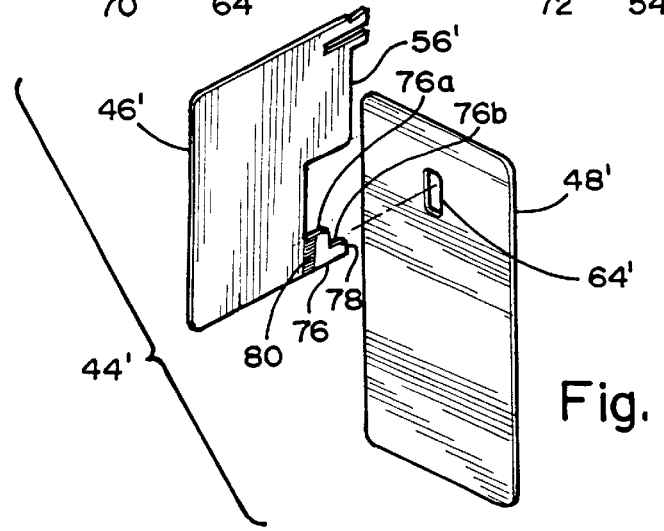
FIG. 5 is an exploded, perspective view of a second embodiment of the airflow test device of the present invention.

FIG. 5 illustrates a second embodiment of the present invention wherein an airflow test device 44' comprises a retainer 46' and a vent card 48'. The retainer 44' mounts to an outlet grate 28' and the vent card 48 is hung from the retainer 46' by having a support finger 76 extend through an aperture 64'. The terminal edge 78 of the support finger 76 extends to the rear edge 56' such that when the retainer 46' is mounted to the grate 28', the terminal edge 78 abuts the grate 28'. The support finger 76 has a stepped configuration including a first support surface 76a for supporting the vent card 48' in the first position and a second support surface 76b, offset from the first support surface 76a, for supporting the vent card 48' in a second position adjacent the outlet grate 28'. The support finger 76 further includes an indicator marking 80 which is covered by the vent card 48' when the vent card 48' is supported in the first position.

During dryer operation, if the airflow through the grate 28 is adequate, the vent card 48' is moved toward the outlet grate 28' along the support finger 76 such that the indicator marking 80 is exposed signaling that the airflow rate is adequate. In this second embodiment, the vent card 48' remains supported by the support finger 76 when sucked into the outlet grate 28'. If the airflow is inadequate, the vent card 48' will not move toward the outlet grate 28' wherein the indicator marking 80 is not exposed signaling that the exhaust venting should be checked for obstructions or other problems.

It can be seen, therefore, that the present invention provides for a relatively inexpensive and simple air flow measuring device for a dryer. The present invention, accordingly, provides a device which can be included in the installation materials for dryers for ready use by a consumer such that a consumer can easily determine whether the dryer's exhaust ducting has been properly installed.

While the present invention has been described with reference the above described embodiments, those of skill in the Art will recognize that changes may be made thereto without departing from the scope of the invention as set forth in the appended claims.

We claim:

1. A device for checking the adequacy of the rate of airflow in a clothes dryer, the clothes dryer having a drum for receiving clothes and an outlet grill through which air is exhausted from the drum of the dryer, the device comprising:

a retainer mounted to the outlet grill; and a vent card removably supported on the retainer a predetermined distance from the outlet grill, wherein movement of the vent card toward the outlet grill during clothes dryer operation signals that an adequate rate of airflow is passing through the outlet grill.

2. The device for checking the adequacy of the rate of airflow in a clothes dryer according to claim 1 wherein the retainer has an arm for engaging the outlet grill such that the retainer can be mounted to the outlet grill.

3. The device for checking the adequacy of the rate of airflow in a clothes dryer according to claim 1, further wherein the retainer and the vent card are fabricated out of cardboard material.

4. The device for checking the adequacy of the rate of airflow in a clothes dryer according to claim 1, further comprising:

a cardboard sheet having a perforated line, the cardboard sheet forming the retainer and the vent card separated by the perforated line wherein the cardboard sheet is frangible along the perforated line.

5. The device for checking the adequacy of the rate of airflow in a clothes dryer according to claim 1, further comprising:

the retainer having a support finger upon which the vent card is removably supported the predetermined distance from the outlet grill such that during operation an adequate rate of airflow through the dryer draws the vent card off the support finger.

6. The device for checking the adequacy of the rate of airflow in a clothes dryer according to claim 5, further wherein:

the support finger has upwardly angled top edge surface such that the support finger forms a hook-type member for securely supporting the vent card.

7. The device for checking the adequacy of the rate of airflow in a clothes dryer according to claim 1, further wherein:

the vent card is a planar member which is supported substantially parallel to the outlet grill the predetermined distance from the outlet grill.

8. The device for checking the adequacy of the rate of airflow in a clothes dryer according to claim 1, further wherein:

the retainer has an indicator marking which is covered by the vent card when the vent card is supported by the retainer in the first position such that during clothes dryer operation, if the vent card is moved toward the outlet grill, the indicator marking is exposed signaling that the airflow rate is adequate.

9. The device for checking the adequacy of the rate of airflow in a clothes dryer according to claim 1, further wherein:

the retainer has a support finger; and the vent card has an aperture through which the support finger extends such that the vent card is removably supported by the support finger.

10. The device for checking the adequacy of the rate of airflow in a clothes dryer according to claim 9, further wherein:

the support finger has an indicator marking which is covered by the vent card when the vent card is supported by the support finger in the first position such that during clothes dryer operation, if the vent card is moved toward the outlet grill, the indicator marking is exposed signaling that the airflow rate is adequate.

11. The device for checking the adequacy of the rate of airflow in a clothes dryer according to claim 1, further comprising:

a cross-piece which connects to the retainer such that when the retainer is mounted to the outlet grill, the cross-piece engages the outlet grill and orients the retainer perpendicular to the outlet grill.

12. A device for checking the adequacy of the rate of airflow in a clothes dryer, the clothes dryer having a drum for receiving clothes and an outlet grill through which air is exhausted from the drum of the dryer, the device comprising:

a retainer having a pair of arms for mounting the retainer to the outlet grill, the retainer further having a support finger; and a vent card removably supported on the support finger a predetermined distance from the outlet grill, wherein removal of the vent card off the support finger during clothes dryer operation signals that an adequate rate of airflow is passing through the outlet grill.

13. The device for checking the adequacy of the rate of airflow in a clothes dryer according to claim 12, further comprising:

a cross-piece which connects to the retainer such that when the retainer is mounted to the outlet grill, the cross-piece engages the outlet grill and orients the retainer perpendicular to the outlet grill.

14. The device for checking the adequacy of the rate of airflow in a clothes dryer according to claim 12, further comprising:

a cardboard sheet having a perforated line, the cardboard sheet forming the retainer and the vent card separated by the perforated line wherein the cardboard sheet is frangible along the perforated line.

15. A method of checking the adequacy of the rate of airflow in a clothes dryer, the clothes dryer having a drum accessible through a door and an outlet grill through which air is exhausted from the drum of the dryer, the method comprising the steps of:

mounting a retainer to the outlet grill;

hanging a vent card from the retainer a predetermined distance from the outlet grill;

energizing the dryer; and observing the status of the vent card.

16. The method of checking the adequacy of the rate of airflow in a clothes dryer according to claim 15, further comprising the steps of:

opening the door of the dryer to access the interior of the drum to mount the retainer;

closing the door after hanging the vent card;

energizing the dryer for a predetermined test period; and determining whether the vent card was removed from the retainer by the airflow in the dryer during the test period.

17. The method of checking the adequacy of the rate of airflow in a clothes dryer according to claim 15, further comprising the steps of:

opening the door of the dryer to access the interior of the drum to mount the retainer;

closing the door after hanging the vent card;

energizing the dryer for a predetermined test period; and determining whether the vent card was moved toward the outlet grill by the airflow in the dryer during the test period.

* * * * *

UNITED STATES PATENT AND TRADEMARK OFFICE
CERTIFICATE OF CORRECTION

PATENT NO. : 5,809,828
DATED : September 22, 1998
INVENTOR(S) : Dale Wayne Gardell, et. al.

It is certified that error appears in the above-identified patent and that said Letters Patent is hereby corrected as shown below:

Title page, item [54], and col. 1, should read --"Clothes Drayer Exhaust Test Device" --.

Signed and Sealed this

Twelfth Day of January, 1999

Attest:

Attesting Officer

*Acting Commissioner of Patents and Trademarks*

UNITED STATES PATENT AND TRADEMARK OFFICE
CERTIFICATE OF CORRECTION

PATENT NO. : 5,809,828
DATED : September 22, 1998
INVENTOR(S) : Dale Wayne Gardell, et al.

It is certified that error appears in the above-indentified patent and that said Letters Patent is hereby corrected as shown below:

Title page, item [54], and col. 1, should read--"Clothes Dryer Exhaust Test Device"--.

This certificate supersedes Certificate of Correction issued January 12, 1999.

Signed and Sealed this

Sixth Day of July, 1999

Attest:

Q. TODD DICKINSON

*Attesting Officer*    *Acting Commissioner of Patents and Trademarks*